Figure 1:
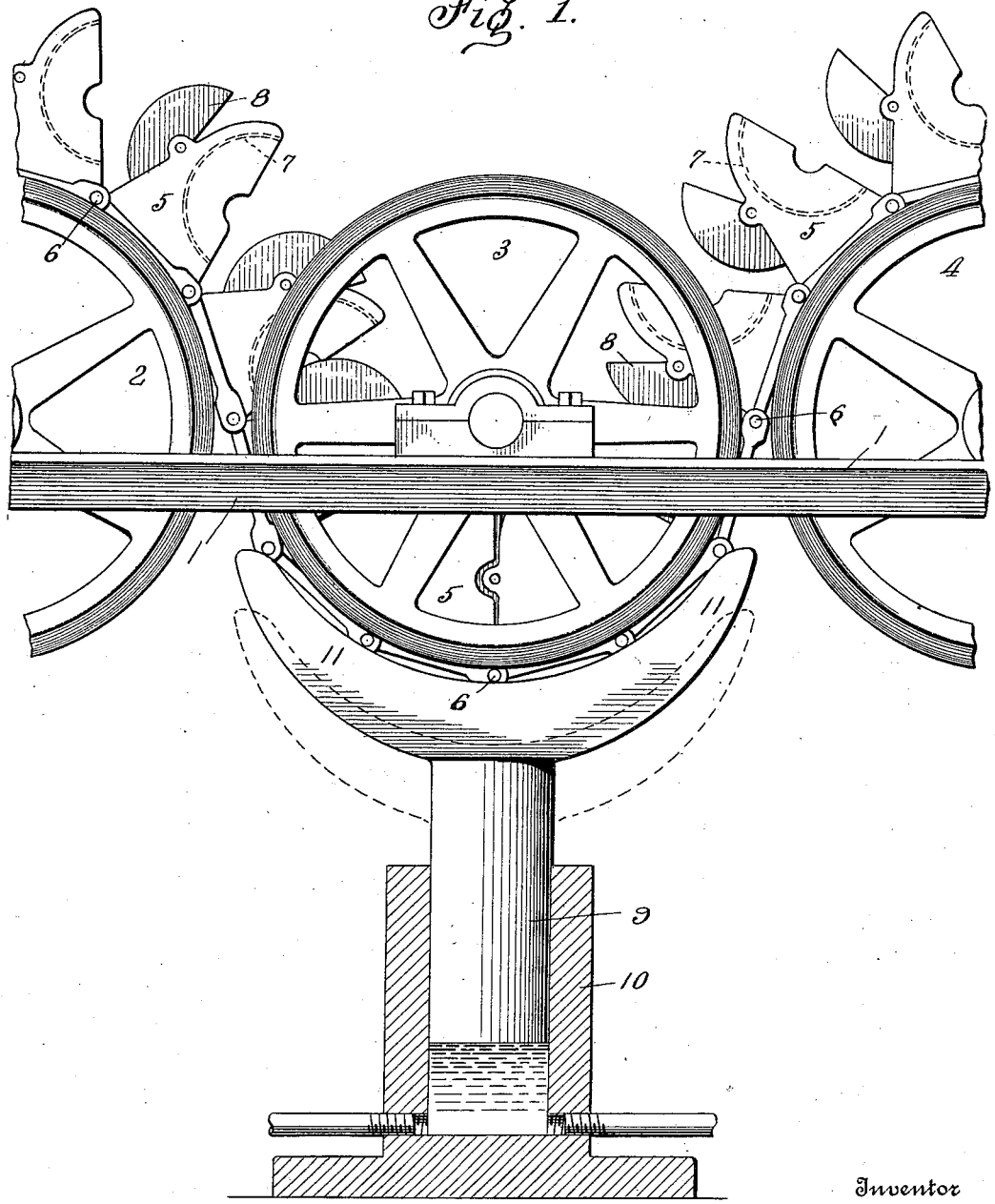

J. J. BERRIGAN.
APPARATUS FOR EXPRESSING LIQUIDS FROM SOLIDS.
APPLICATION FILED MAY 25, 1911.

1,018,958.

Patented Feb. 27, 1912.

Witnesses

Inventor
John J. Berrigan
By K. P. McElroy
Attorney

J. J. BERRIGAN.
APPARATUS FOR EXPRESSING LIQUIDS FROM SOLIDS.
APPLICATION FILED MAY 25, 1911.

1,018,958.

Patented Feb. 27, 1912.
5 SHEETS—SHEET 4.

Witnesses
H. C. Polmette
R. F. Steward

Inventor
John J. Berrigan
By K. P. McElroy
Attorney

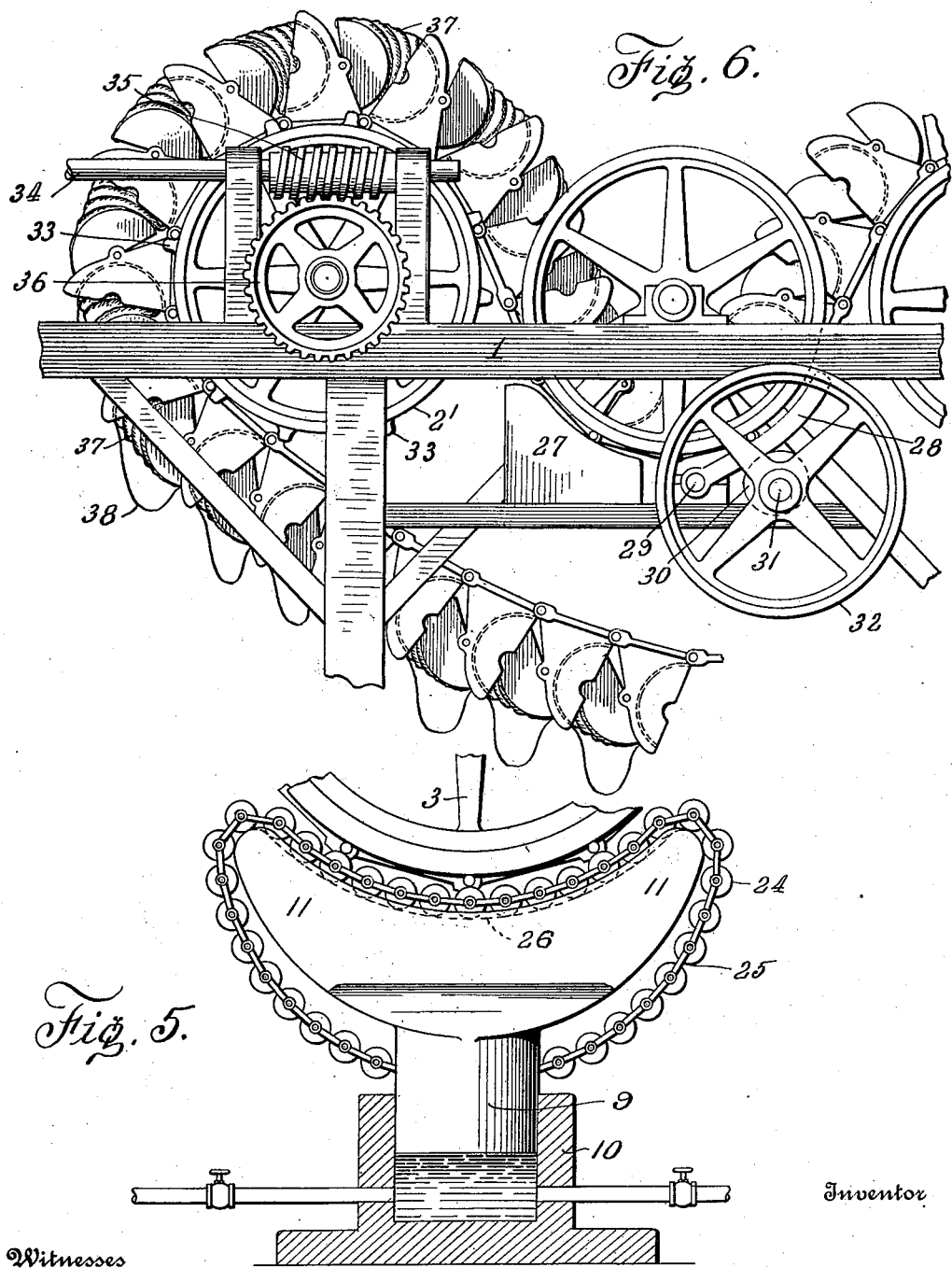

UNITED STATES PATENT OFFICE.

JOHN J. BERRIGAN, OF ORANGE, NEW JERSEY, ASSIGNOR TO KATIE S. BERRIGAN, OF ORANGE, NEW JERSEY.

APPARATUS FOR EXPRESSING LIQUIDS FROM SOLIDS.

1,018,958.   Specification of Letters Patent.   Patented Feb. 27, 1912.

Application filed May 25, 1911. Serial No. 629,434.

*To all whom it may concern:*

Be it known that I, JOHN J. BERRIGAN, a citizen of the United States, residing at Orange, in the county of Essex and State of New Jersey, have invented certain new and useful Improvements in Apparatus for Expressing Liquids from Solids, of which the following is a specification.

This invention relates to apparatus for expressing liquids from solids; and it comprises a plurality of transverse bars linked together in an endless beltlike assemblage, said bars being so relatively placed and spaced as to form presser chambers between the bars of coöperating pairs of bars, means for giving such assemblage one or more curvatures concave as regards the operative face of the assemblage for the purpose of compressing material in such chambers, and means for applying extraneous pressure to such material while under the pressure due to concave curvature; all as more fully hereinafter set forth, and as claimed.

In certain other and copending applications, Serial Nos. 514,851 and 566,208, now respectively matured into Patents 994,495 and 994,632, both of June 6, 1911, I have described and claimed means and methods of performing expression wherein the material to be expressed is placed under lateral pressure from the side walls of presser chambers formed between transverse presser bars linked into an endless beltlike assemblage, said beltlike assemblage being looped over wheels or wheel-like members carried by a stationary framework and the looping being such as to give alternating concave and convex curvature to the operative face of the assemblage. In a concave curvature the walls of the presser chambers tend to approximate and produce pressure therebetween. In practice I may employ coöperating bars arranged in pairs with press cloth bags in the press chambers formed by each pair. The bars may advantageously be so shaped as to produce an arcuate or crescent shaped press chamber between the two members of each pair. Pairs of bars may be mounted at their ends on appropriate castings and these castings linked together to form a pair of parallel belts spaced and united by the transverse presser bars. These castings may be provided with pins adapted to ride over or under, as the case may be, one or more pairs of opposite wheels, going under the rim of a wheel in a concave bend and over that of another in a convex bend. Or the castings may be united by transverse rods having extensions beyond the castings to serve as such riding pins.

In the operation of a structure such as described, when the press chambers are empty in the concave curve, with the usual structure, the beltlike assemblage rides the wheel closely, from three to five of the pins engaging the wheel rim; but with the chambers filled it is not possible to make a curve of such short radius and but one pin, or perhaps three, will engage. There is pressure between the chamber walls at all points in the descending and ascending quadrants, this pressure gradually increasing toward the lowest point in the curve in the descending quadrant to reach a maximum at such point and then again gradually decreasing in the ascending quadrant. There is pressure at all points; but the maximum pressure is at the low point.

With many materials yielding viscous expressates the time which must be allowed for expression is relatively great, these liquids flowing very slowly; and with some such materials to give the desirable amount of time for complete expulsion of the liquid may require quite a slow speed of revolution or perhaps a pause to allow time for flow. This pause is sometimes better for mechanical reasons than a very slow speed of travel. While this method of allowing the material to pause in its travel when in or near the phase of maximum pressure is very effective in securing complete expression of contained liquid, I have found that by the application of supplemental external pressure to the beltlike assemblage before described, it is possible to considerably increase the amount of material which such assemblage has hitherto been capable of treating, while at the same time the completeness of the expression is in nowise reduced. When the presser chambers are filled with material the weight of the load causes the beltlike assemblage to sag away from the wheel more or less, portions thus tending to straighten out into arcs of longer radius than that of the wheel. Obviously where this occurs the pressure between adjacent coöperating presser members is lessened, the degree of such pressure probably bearing a rather complicated reciprocal relation to the radius of the curve followed by the assemblage in the concave phase. In other words the effective pressure between the presser members increases with the sharpness of the concave curve which they follow, the sharpness of the curve being limited only by the design of the articulating presser elements in any particular assemblage thereof. Where no positive means are employed to hold the concaved belt against the wheel, the curvature of the belt will therefore not conform perfectly to that of the wheel; so that, as before noted, while there will be pressure at all points in the concave phase, the pressure will not be uniform. At or near the bottom of the wheel the pressure is a maximum, while either side of that point it is less.

In the present invention I apply external pressure to the beltlike assemblage in such a manner that it is compelled to conform more nearly to the arc of the wheel during the concave or pressing phase than it does ordinarily. In this way, the maximum pressure between presser elements formerly obtainable at substantially only one point or very short arc of the concave curvature is distributed over a much longer arc, with consequent increase in the amount of material simultaneously exposed to such maximum pressure. The particular means whereby this effect may be obtained are various, depending in part upon whether the press is to run continuously or intermittently. If continuously, special means for obviating friction are best provided. In general I employ a device having a curved bearing surface adapted to be forced against the concaved beltlike assemblage and to cause it to conform to and to hug the wheel over any desired portion of the wheel periphery. Very conveniently the extraneous pressure device may be mounted on a hydraulic ram, although other means are suitable. It is best that the extraneous pressure be more or less yielding in character in order to secure smooth running where the press is operated continuously; and on this account, where hydraulic pressure is employed, the ram should be properly valved to give a cushioning action. If desired, instead of moving the supplemental pressure face, it may be fixedly mounted, while the pair of wheels carrying the concaved beltlike assemblage may be forced by a ram or otherwise against the pressure face.

In the accompanying drawings I have shown, more or less diagrammatically certain organizations of apparatus elements suitable for use in the described invention.

Figure 2:
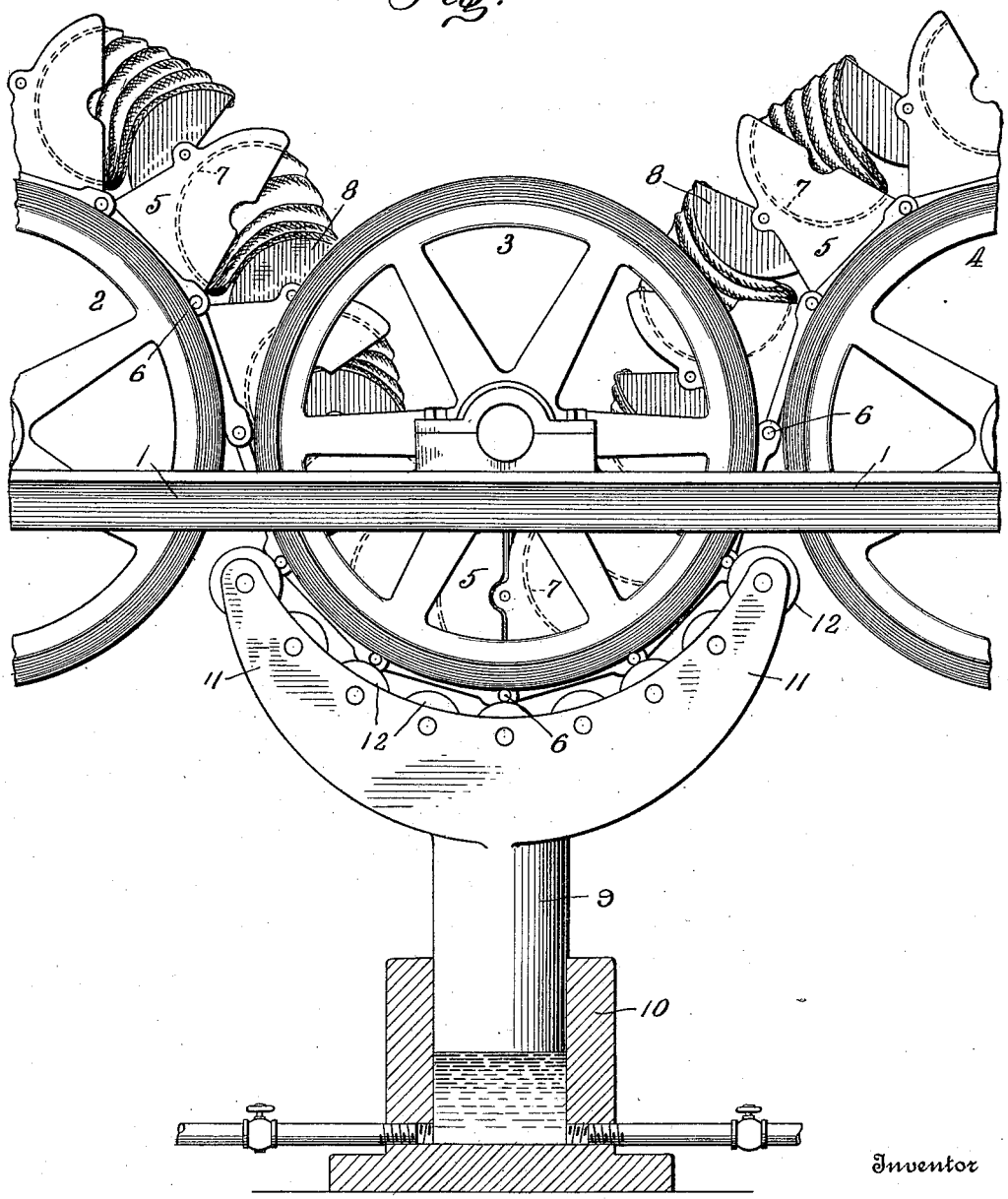
Figure 3:
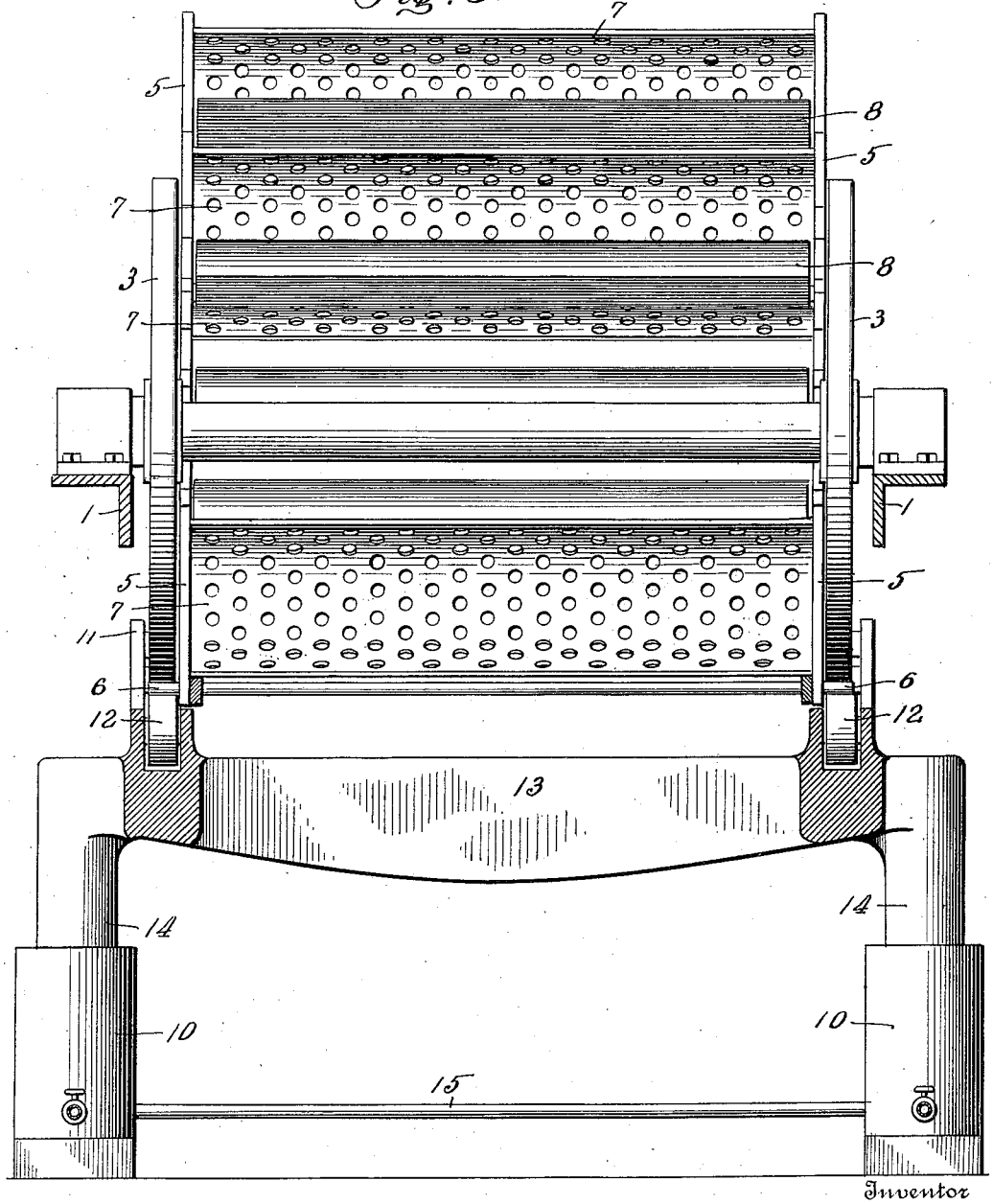
Figure 4:
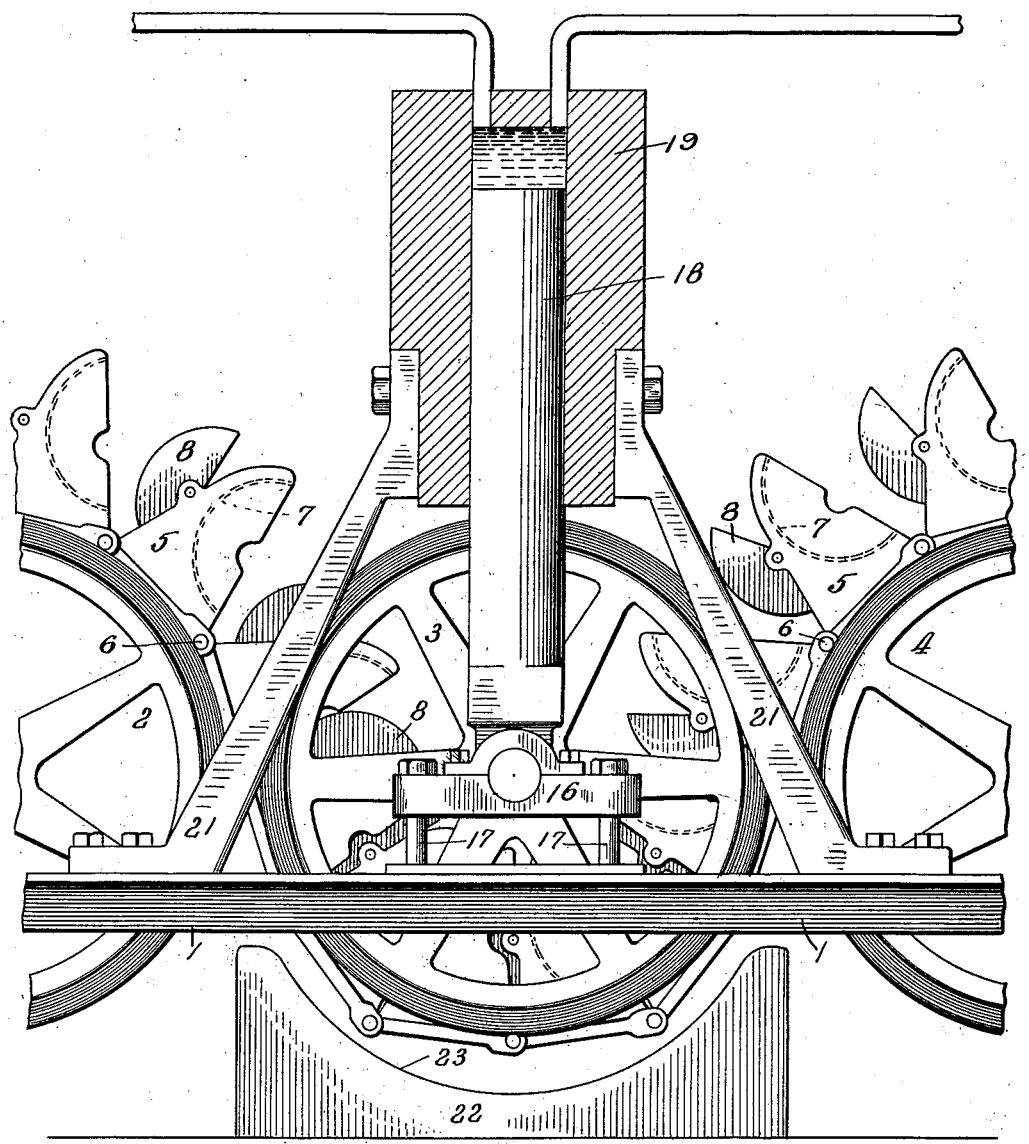

In this showing: Figures 1 and 2 are side elevations of intermittently and continuously operating apparatus respectively, supplemental pressure being applied from below; Fig. 3 shows a transverse section through Fig. 2, parts being in elevation; Fig. 4 is a side elevation of an intermittently operating apparatus, supplemental pressure being applied from above; Fig. 5 is a side elevation of a modification; and Fig. 6 is an elevation, partly in section of a modified type of pressure device.

Referring to Figs. 1, 2, and 3, of the drawings, 1 is a framework upon which are mounted in suitable bearings the shafts of wheels 2, 3 and 4. A similar set of wheels is located on the opposite side of the apparatus. Supported on the two sets of wheels is a beltlike assemblage comprising members such as triangular castings 5 linked together by rods whose ends project to form pins 6 adapted to ride on the peripheries of the wheels. These rods extend across the width of the press and link a similar set of castings on the opposite side. Extending between each pair of oppositely disposed castings and fixedly secured thereto at its ends is perforate bar or bucket member 7 (shown dotted) which is conveniently arcuate in form, while imperforate rocker members 8 are pivotally mounted at their ends on the castings, and have curved pressing faces conforming to the shape of the buckets. Each bucket with its coöperating rocker forms a press chamber or unit, the pressing walls of which are adapted to approximate when the working surface of the beltlike assemblage is concaved as by wheel (3) and to spread apart when the working surface is convexed as by wheel (4). Piston 9 working in cylinder 10 of a hydraulic ram has curved arms 11 adapted to engage the pins (6) and hold them against the wheel (3) as shown in Fig. 1, which represents an apparatus in which the supplemental pressure is to be applied intermittently. For continuous application of such pressure, rollers 12 mounted in the curved pressure arms as shown in Fig. 2, serve to render the operation of the apparatus relatively smooth. A supplemental pressure device is provided for each wheel of a pair about which the beltlike assemblage of presser members is concaved. Such devices may be independent of each other. Or, and more conveniently, they may be arranged as shown in Fig. 3, where the curved pressure arms are carried by a transversely extending member 13 whose depending ends 14 form the pistons of hydraulic rams (10). In order to equalize the pressure on the wheels, it is well to connect the pressure chambers of the rams as by pipe 15.

In Fig. 4 is shown a somewhat different arrangement in which the shaft of wheel (3) is mounted in bearing 16 vertically slidable on bolts 17. Piston 18 of ram 19 supported on the framework by members 21, is arranged to press the concaved presser belt against the fixed member 22 having an upper curved bearing surface 23.

Instead of mounting rollers in the pressure arms as in Fig. 2, the arrangement shown in Fig. 5 is often useful. In this modification the rollers 24 are connected by links 25 to form an endless belt of rollers running in groove or runway 26 on the upper side of curved arms (11).

In Fig. 6 is shown still another modification in which the conformation of the concaved belt to the wheel is accomplished by means of fixed member 27 holding the belt against one lower quadrant, while curved arm 28 pivoted at 29 is forced toward the other lower quadrant as desired by cam 30 fixed on shaft 31 which is turned by wheel 32. In this figure is also shown means for driving the beltlike assemblage of presser members. An end wheel 2' having sprocket teeth 33 engaging the projecting pins of the belt is driven by some suitable source of power, not shown, through shaft 34, worm 35, and gear 36. The press chambers may be provided with end seals 37 and filter cloths 38, the latter being best arranged to bag outwardly when the press chambers are inverted.

The operation of the apparatus is sufficiently obvious from the foregoing description. Where the supplemental pressure is to be applied intermittently, employing for example the apparatus of Fig. 1, the belt is traveled over and under the supporting wheels at the desired speed with the ram lowered into the position indicated by the dotted lines (see Fig. 1). When it is desired to apply the supplemental pressure, the press is stopped and the ram is raised until the curved arms engage the projecting pins of the linked belt and forces them against the wheel periphery. That portion of the concaved beltlike member spanned by the curved arms is thus compelled to assume substantially the curvature of the wheel and the walls of each press unit or chamber are consequently approximated to the same extent as they are at the point between the lower quadrants. That is, the maximum effective pressure, instead of existing at practically only one point as it does where no supplemental pressure is used, is now distributed over an arc of considerable length. The average radius of curvature of the concave presser belt is thus shortened in the concave or pressing phase, thereby greatly increasing the average effective pressure between the chamber walls throughout that phase. Where intermittent pressure is applied from above as in using the apparatus shown in Fig. 4, the procedure is much the same as just described. It is very desirable however in many instances to apply the supplemental pressure continuously without stopping the press, and for this purpose the apparatus of Fig. 2 is useful. Aside from the fact that no stopping of the press is required, the operation of this type of apparatus does not differ materially from the intermittent type. The roller members carried by the curved arms serve to eliminate a large part of the frictional resistance which would otherwise be excessive. Continuous pressure may of course be applied from above also by employing an apparatus generally similar to that of Fig. 4 but having antifriction means positioned on the fixed conforming member (22).

While I have described specific structures in the foregoing disclosure, it is to be understood that they are for purposes of illustration only. Any apparatus of the general type disclosed in this and in my copending applications above referred to, having means for applying extraneous supplemental pressure to a flexible presser member, is within the scope of the present invention.

What I claim is:—

1. In a press, a flexible beltlike member, press chambers having relatively movable walls positioned thereon, means for concaving said flexible member to approximate the walls of said press chambers, and means for applying extraneous pressure to the flexible member so concaved.

2. In a press, a flexible beltlike member, press chambers having relatively movable walls positioned thereon, means for concaving said flexible member to approximate the walls of said press chambers, and means for holding said beltlike member against said concaving means.

3. In a press, a flexible beltlike member, press chambers having relatively movable walls positioned thereon, means for concaving said flexible member to approximate the walls of said press chambers, and a shaped member conforming to said concaving means and adapted to hold said beltlike member thereagainst.

4. In a press, a flexible beltlike member, press chambers having relatively movable walls positioned thereon, means for concaving said flexible member to approximate the walls of said press chambers, and hydraulic pressure means for forcing said beltlike member against said concaving means.

5. In a bar press, a flexible beltlike member provided with transverse press chambers, means for bending said member in a concave curve to produce lateral pressure in said chambers and supplemental means for altering the shape of said curve.

6. In a bar press, a flexible beltlike member provided with transverse press chambers, means for bending said member in a concave curve to produce lateral pressure in said chambers and hydraulic means for altering the shape of said curve.

7. In a bar press, a flexible beltlike member comprising transverse pairs of presser bars spaced to produce press chambers therebetween, means for producing a concave bend in said element to produce pressure in said chambers and supplemental means for altering the degree of curvature of said bend, said means comprising a shaped member adapted to engage simultaneously a plurality of pairs.

8. In a bar press, a flexible beltlike member comprising transverse pairs of presser bars spaced to produce press chambers therebetween, means for producing a concave bend in said element to produce pressure in the chambers and hydraulically actuated supplemental means for altering the degree of curvature of said bend, said means comprising a shaped member adapted to engage simultaneously a plurality of pairs.

In testimony whereof, I affix my signature in the presence of witnesses.

JOHN J. BERRIGAN.

Witnesses:
 ALBERT J. SMITH,
 JOHN H. TRENT.